(12) United States Patent
Nilsson

(10) Patent No.: US 12,135,127 B2
(45) Date of Patent: Nov. 5, 2024

(54) ALUMINIUM COMBUSTION FOR HEAT GENERATION

(71) Applicant: SAAB AB, Linköping (SE)

(72) Inventor: Daniel Nilsson, Hjärup (SE)

(73) Assignee: SAAB AB, Linköping (SE)

( * ) Notice: Subject to any disclaimer, the term of this patent is extended or adjusted under 35 U.S.C. 154(b) by 484 days.

(21) Appl. No.: 17/603,694

(22) PCT Filed: Apr. 14, 2020

(86) PCT No.: PCT/SE2020/050382
§ 371 (c)(1),
(2) Date: Oct. 14, 2021

(87) PCT Pub. No.: WO2020/214076
PCT Pub. Date: Oct. 22, 2020

(65) Prior Publication Data
US 2022/0214039 A1    Jul. 7, 2022

(30) Foreign Application Priority Data
Apr. 15, 2019  (SE) ..................... 1950471-1

(51) Int. Cl.
*F22G 1/14* (2006.01)
*C01B 3/08* (2006.01)
(Continued)

(52) U.S. Cl.
CPC ............... *F22G 1/14* (2013.01); *C01B 3/08* (2013.01); *F22G 1/12* (2013.01); *F24V 30/00* (2018.05);
(Continued)

(58) Field of Classification Search
CPC ... F22G 1/12; F22G 1/14; F01K 25/04; F01K 25/06; F01K 21/04; C01B 3/10;
(Continued)

(56) References Cited

U.S. PATENT DOCUMENTS 3,771,313 A * 11/1973 Kaiho ...................... F02K 7/08
60/221
3,975,913 A *  8/1976 Erickson ................. F02G 1/043
60/671
(Continued)

FOREIGN PATENT DOCUMENTS

WO    WO-2019039991 A1 *  2/2019  ............... B63G 8/10

OTHER PUBLICATIONS

Vladimir Shmelev, et al. "Hydrogen generation by reaction of molten aluminum with water steam", International Journal of Hydrogen Energy, vol. 41, Issue 33, 2016 <https://www.sciencedirect.com/science/article/pii/S0360319916317694> (obtained Mar. 13, 2024) (Year: 2016).*

(Continued)

*Primary Examiner* — Alain Chau
(74) *Attorney, Agent, or Firm* — Sage Patent Group

(57) ABSTRACT

Provided is a heat generating arrangement and a method for generation of heat to be used in a heat consumer. The heat generating arrangement uses combustion of aluminium and hydrogen to raise the temperature of superheated steam inside the heat generating arrangement. The heat in the superheated steam can thereafter be used in a heat consumer, such as a heat exchanger.

23 Claims, 6 Drawing Sheets

(51) Int. Cl.
*F22G 1/12* (2006.01)
*F24V 30/00* (2018.01)

(52) U.S. Cl.
CPC .. *C01B 2203/0216* (2013.01); *C01B 2203/08* (2013.01); *C01B 2203/84* (2013.01)

(58) Field of Classification Search
CPC .................. C01B 3/08; C01B 2203/84; F23B 2900/00003; F23B 10/02; F02C 9/40; F24V 30/00
USPC ........................................................ 60/39.55
See application file for complete search history.

(56) References Cited

U.S. PATENT DOCUMENTS

| | | | |
|---|---|---|---|
| 4,698,974 A | 10/1987 | Wood | |
| 8,656,724 B2* | 2/2014 | Cawley | F01K 21/04 60/39.55 |
| 2007/0056210 A1 | 3/2007 | Schmidt | |
| 2009/0289457 A1 | 11/2009 | Gleasman | |
| 2010/0178239 A1 | 7/2010 | Von Wimmersperg et al. | |
| 2011/0165060 A1* | 7/2011 | Milani | C01B 3/08 422/111 |
| 2011/0252800 A1* | 10/2011 | Cawley | F01K 21/04 60/645 |
| 2013/0065187 A1* | 3/2013 | Yoon | C06B 43/00 431/89 |
| 2016/0369700 A1* | 12/2016 | Ribarov | B64D 37/34 |
| 2017/0284227 A1* | 10/2017 | Eckert | F24V 30/00 |
| 2018/0328584 A1 | 11/2018 | Eckert et al. | |
| 2020/0223709 A1* | 7/2020 | Bengtsson | F24V 30/00 |

OTHER PUBLICATIONS

International Search Report and Written Opinion mailed Jun. 10, 2020 for International Patent Application No. PCT/SE2020/050382, 17 pages.

* cited by examiner

ALUMINIUM COMBUSTION FOR HEAT GENERATION

CROSS-REFERENCE TO RELATED APPLICATIONS

This application is a 35 U.S.C § 371 national stage application for International Application No. PCT/SE2020/050382, entitled "ALUMINIUM COMBUSTION FOR HEAT GENERATION", filed on Apr. 14, 2020, which claims priority to Swedish Patent Application No. SE1950471-1, "ALUMINIUM COMBUSTION FOR HEAT GENERATION", filed Apr. 15, 2019, the disclosures and contents of which are hereby incorporated by reference in their entireties.

TECHNICAL FIELD

The disclosure relates to a heat generating arrangement, arranged to provide heat to a heat consumer through the reaction between aluminium and water and between hydrogen and oxygen.

The disclosure also relates to a method for providing heat to a heat consumer.

BACKGROUND ART

It is known in the art to provide heat for use in heat exchangers and heat engines. One way of producing heat is by chemical reactions. The heat created in the chemical reaction can be used to heat a medium, such as a gas or a liquid, which is either not consumed by the reaction or that is created in the reaction. One such chemical reaction known to generate heat is the combustion of aluminium. This reaction is for instance used to propel rockets or to provide hydrogen that in turn can be combusted to provide heat.

However, aluminium under normal conditions is protected by an outer layer of aluminium oxide that is created by a reaction between the aluminium and the water in the surrounding air. Thus, a number of techniques have been used to remove the protective layer or to prevent the forming of such a layer.

These techniques are difficult to implement or expensive as they may require placing the aluminium in a melt of other metals or processing the aluminium with passivating agents to prevent the formation of aluminium oxide on the surface of the aluminium, see for instance U.S. Pat. No. 9,056,769 B1, US 2013/0276769 A1 and US 2011/0252800 A1.

In WO 2019/039991 A1, a system for combustion of aluminium comprises feeding a solid wire of aluminium to a substantially oxygen-free furnace. Micrometer-sized particles are formed from the wire. Feeding water or steam is used as an oxidizer for a reaction between the aluminium and the water or steam to take place.

There is thus a need for improvement in the generation of heat from aluminium combustion.

SUMMARY OF THE INVENTION

One object of the present disclosure is to provide a heat generating arrangement for providing heat to a heat consumer where the previously mentioned problems are at least partly avoided. This object is achieved by the features of the characterising portion of claims 1 and 13. Various embodiments are described in the appended dependent claims.

The disclosure relates to a heat generating arrangement. The arrangement comprises:

a heating arrangement arranged to receive aluminium and superheated steam, wherein the heating arrangement is arranged to be heated by superheated steam having a heating arrangement temperature and arranged to melt the aluminium inside the heating arrangement to form liquid aluminium, an atomizing arrangement arranged at an outer end of the heating arrangement arranged to atomize the liquid aluminium at the outer end of the heating arrangement by using superheated steam exiting the heating arrangement as atomizer;

a reactor connected to the outer end of the heating arrangement in which the liquid atomized aluminium is arranged to react with the superheated steam exiting the heating arrangement to produce aluminium oxide, hydrogen and heat, thereby increasing the temperature of the superheated steam that is not consumed by the reaction with the liquid atomized aluminium in the reactor to a reactor temperature;

a combustion chamber connected to the reactor and to the heating arrangement arranged to receive superheated steam having the reactor temperature and hydrogen, wherein oxygen or air is provided to the combustion chamber from an external oxygen source, an external air supply or from the atmosphere, wherein a heat consumer is arranged in direct connection to the combustion inside the combustion chamber, where either the hydrogen is spontaneously combusted inside the combustion chamber to increase the temperature of the superheated steam to a heat consumer temperature, where the superheated steam having the heat consumer temperature exchanges heat with a heat exchange medium within the heat consumer, lowering the temperature of the superheated steam to the heating arrangement temperature, or the hydrogen is spontaneously combusted inside the combustion chamber to provide high temperature exhausts to the heat consumer and where superheated steam is continuously added to the heat generating arrangement. With direct connection means, for instance, that the heat consumer is arranged in close vicinity of the combustion or that the heat consumer is a part of a heat exchanger arranged inside the combustion chamber. With close vicinity of the heat consumer means that it is possible to design the combustion chamber structure to be protected from high temperatures from the combustion heat release.

Briefly, the heat generating arrangement can be seen as a semi closed loop in which two chemical reactions take place. The arrangement will be supplied with oxygen and aluminium from external sources. Aluminium oxide will be removed from the arrangement to be converted back to aluminium and can be reused in the heat generating arrangement. Superheated steam will circulate in the heat generating arrangement, where at least a part of it will decompose in the first reaction and thereafter be recreated in the second reaction. The total mass of superheated steam in the arrangement will remain essentially constant. When using oxygen, the superheated steam will not be condensed at any time but will have different temperatures throughout the heat generating arrangement depending on the location in the heat generating arrangement. When using air to combust hydrogen, condensation of the superheated steam is used, as it is an effective way to remove the nitrogen from the system.

The separation of solid aluminium oxide particles from the superheated steam and hydrogen will preferably take place in an insulated reactor/separator. Insulating the reactor/separator ensures that as much as possible of the reaction heat from the first reaction is kept in the superheated steam during transport to the combustion chamber. The pump may assist in creating separation of the aluminium oxide from the superheated steam in the reactor/separator.

In the combustion chamber, oxygen is supplied and the second reaction, i.e. combustion of hydrogen, will occur spontaneously due to the high temperature. The reaction is arranged to occur in direct contact with the heat consumer. The heat consumer will work as a heat sink, allowing the high temperature of the combustion.

One advantage with such a heat generating arrangement is that it allows for an efficient heat generation from the reaction between aluminium and water (in the form of superheated steam) in a first reaction and between hydrogen, created in the first reaction, and oxygen in a second reaction. These two reactions can be used in a closed system, where the amount of superheated steam is essentially constant due to the balance between the consumption of water in the aluminium reaction and the creation of water in the hydrogen burning reaction. Alternatively, the heat generating arrangement can be used as an open-loop arrangement, such as providing combustible hydrogen to a gas turbine. In this case, superheated steam needs to be continuously added to sustain the reaction with the aluminium.

Normally, aluminium, although it is a reactive metal, is difficult to get to react with water due to the protective layer of aluminium oxide that is created through contact with oxygen in the atmosphere. High temperatures, creation of aluminium alloys or use of de-passivation agents are known to be needed to make the aluminium reactive with water, by either removing the protective aluminium oxide layer or to make it more difficult to be created. In the present disclosure, elemental aluminium is melted in a heating arrangement into liquid aluminium by heat exchange with the superheated steam before being atomized by the superheated steam and simultaneously introduced into the superheated steam in order to create a reaction between the atomized aluminium and the superheated steam, i.e. between aluminium and water. This enables the use of solid aluminium, which is easily handled and stored, as a starting point for the reaction.

The first reaction between aluminium and water in the form of superheated steam creates aluminium oxide, hydrogen and heat. The heat generated by the first reaction increases the temperature of the superheated steam that is not consumed in the first reaction. This heated superheated steam is transported together with the hydrogen to a combustion chamber where the second reaction occurs in form of combustion of the hydrogen. An oxidiser (e.g. oxygen or air) is introduced into the combustion chamber from an external source. The combustion of hydrogen creates water, in the form of superheated steam, and generates heat. The additional heat generated by the second reaction further raises the temperature of the superheated steam in the combustion chamber, which thereafter is used by a heat consumer, which is in thermal connection with the combustion chamber. The exchange of heat between the superheated steam in the combustion chamber and the heat consumer lowers the temperature of the superheated steam. The energy withdrawn from the heat consumer is balanced to ensure that the superheated steam exiting the combustion chamber has a sufficient temperature to melt aluminium. The heat consumer will be described in more detail below. Generally, a heat consumer is any arrangement able to utilize the heat in the superheated steam in the combustion chamber to raise the temperature of a medium in the heat consumer, e.g. a heat exchange medium.

One main difference between the system of WO 2019/039991 A1 and the present disclosure is that the hydrogen in the present disclosure is put to use in a combustion chamber separate from the reactor. The hydrogen reaction ensures that a medium in a heat consumer can reach the desired temperature. The present disclosure presents an arrangement in which aluminium is melted and a first reaction between aluminium and steam takes place inside a reactor, aluminium oxide is removed from the reactor, hydrogen is transported to a combustion chamber where it is combusted in a second reaction with oxygen, the resulting heat from the second reaction is used to heat a medium in the heat consumer and the remaining heat after heating of the medium in the heat consumer is used to melt the aluminium, thereby creating a semi-closed or open loop arrangement.

In order to control the combustion of hydrogen and/or to recreate the desired amount of water in the shape of superheated steam, oxygen or air can be supplied to the combustion chamber. In case of a gas turbine, air from the turbine compressor can be provided to the combustion chamber. The heat and the combustion of hydrogen maintain the desired pressure during the expansion phase. Steam is generated from the heat of the process.

A pump may be connected between the combustion chamber exit and the heating arrangement and be arranged to transport the superheated steam having the heating arrangement temperature from the combustion chamber to the heating arrangement. The pump is preferably placed in or near the combustion chamber exit as the superheated steam temperature has been decreased by the heat consumer. A pump can assist in providing a flow of superheated steam and/or inert gas inside the heat generating arrangement to ensure that the superheated steam leaving the combustion chamber is transported to the heating arrangement with the correct velocity and pressure.

The heat generating arrangement may be arranged to comprise a first amount of superheated steam, exceeding what is required for the reaction with the liquid atomized aluminium. In the system, a first amount of superheated steam is present. The superheated steam transports heat and is used to react with the atomized aluminium. It is also conceivable that the heating arrangement can comprise an exact amount of superheated steam, i.e. at a stoichiometric ratio such that all superheated steam is consumed in the reaction with the aluminium, and that an inert gas is heated and transports the heat from the reactor.

The pump may be arranged to regulate the pressure and velocity of the superheated steam in the heat generating arrangement to assist the heat consumer to control the reactor temperature. It is preferable to be able to control the reactor temperature such that the reactor temperature is kept within a temperature interval suitable for the final temperature for the heat consumer. Keeping the reactor temperature in such a temperature interval also reduces wear on the arrangement and reduces the need for more advanced heat protection in the arrangement, such as an external cooling or the use of temperature resistant ceramics.

Where air is provided to the combustion chamber, the heat generating arrangement may comprise or may be arranged to be connected to a separator for separation of nitrogen. When air used in the arrangement, due to that nitrogen is not expended in any reaction it has to be removed in order to ensure that the amount of nitrogen is not built up to an undesired amount. A nitrogen separator can thus be installed in the arrangement.

The heating arrangement may be arranged to be fed aluminium as a solid piece of aluminium, wherein the heating arrangement comprises a feeding mechanism to continually feed the aluminium into the heating arrangement. By using solid aluminium, the arrangement can easily be supplied with aluminium in a controlled amount.

The aluminium may be in the form of an aluminium wire. In this way, a simple feeding system can be created in which the aluminium can be supplied on spools, or by an integrated machine from which a wire can be drawn from an aluminium bar or similar. The aluminium can of course also be fed into the heating arrangement in other forms, such as a powder or other granular forms.

A bypass connection may be arranged between the reactor and the heating arrangement, allowing superheated steam to bypass the combustion chamber. In order to have a controlled start-up of the system, a bypass connection that can transport superheated steam past the combustion chamber is useful to heat up the system to a working temperature before sending superheated steam with the reactor temperature to the combustion chamber and thereby to the heat consumer. The superheated steam bypassing the combustion chamber has a temperature lower than or equal to the reactor temperature and may be generated by the first reaction or may be introduced from an external source.

The reactor temperature may be in the range of approximately 660° C.-1100° C. depending on how close to the reaction zone the temperature is measured, a mean temperature is preferably approximately 900° C. The heating arrangement temperature may be higher than the melting temperature of aluminium and the temperature of the superheated steam in contact with the heat consumer may be in the range of approximately 700° C.-1900° C. The higher temperatures in the heat consumer temperature range correspond to temperatures close to the flame temperature and the lower temperatures correspond to temperatures of the superheated steam before leaving the combustion chamber, i.e. corresponding to the heating arrangement temperatures. One example temperature range of the steam that exchanges heat with the heat exchange medium is approximately 1100-1800° C., preferably approximately 1200° C.

For the reactor temperature, wall temperatures below 1100° C. are preferred. Local reaction temperatures are estimated to be more than one and less than five times the mean temperature of the flow of superheated steam. External cooling of the arrangement or ceramic materials might be needed in the arrangement to handle higher temperatures, leading to a more complex and more expensive arrangement. Further, in order to reach a desired heat consumer temperature, the reactor temperature are preferred to be in this range. For the heating arrangement temperature, it is advantageous if the temperature of the superheated steam entering the heating arrangement is higher than the melting temperature of the aluminium. Temperatures above the melting point for aluminium removes the need for external heating of the heating arrangement. For the heat consumer temperature, this range provides the working range for a number of example heat consumers. This will be described in more detail below.

The heat consumer may be a high temperature heat exchanger. The heat generating arrangement can be used to provide heat to a number of different applications. Steam turbines and different heat engines uses heat exchangers and are two examples of application. One example of a heat engine for which the arrangement can be used is a Stirling engine. For a gas turbine or heat exchanger using air as oxidizer, the system is an open loop.

The reactor may be insulated to reduce a temperature loss of the superheated steam that is not consumed by the reaction with the liquid atomized aluminium in the reactor. In order to maintain heat generated by the first reaction in the superheated steam, the reactor may be insulated. The insulation can be in any form suitable for the temperature range.

The disclosure also relates to a vehicle or power plant comprising one or more heat generating arrangements according to the above description. The heat generating arrangement may be arranged to act as a heat source for a vehicle or power plant. The heat consumer in the vehicle may be a Stirling engine arranged to propel and/or to provide electrical power to the vehicle. The heat source can be used to for instance heat water or another fluid that needs to be heated. The heat consumer may also be a gas turbine arranged to produce electrical power and/or thrust to a vehicle.

By using a heat generating arrangement according to the disclosure and since the reaction product aluminium oxide is a resource for regeneration, a completely exhaust free heat generating arrangement can be installed in a vehicle as no exhaust from the Stirling engine vehicle is produced. Further, as no combustible fuel has been used to provide heat to the Stirling engine, no residue from burning the hydrocarbons in the normally used fuel has to be washed out of the combustion chamber regularly. In the proposed arrangement, as superheated steam is the only resulting product from the hydrogen combustion, the need for a purge gas is therefore removed.

Further, in comparison with combustion of hydrocarbons such as diesel and pure oxygen the amount and thereby the volume of oxygen required for the combustion of the hydrogen produced from the aluminium water reaction is approximately ¼ of the amount needed to combust the hydrocarbons to obtain the same amount of heat. The volume of aluminium required to obtain the same amount of heat as is generated by today's system is approximately 40% of the volume of diesel needed. Due to the reduced volumes of fuel and oxidant space requirement of the heat generation from aluminium is reduced in comparison to heat generated from combustion of hydrocarbons. Vehicles such as submarines will benefit from small space requirements and the possibility to make an energy system that is weight neutral.

The disclosure also relates to a method for generation of heat for use in a heat consumer in a heat generating arrangement comprising a heating arrangement, a reactor and a combustion chamber. The method comprises:
  providing aluminium to the heating arrangement;
  providing superheated steam having a heating arrangement temperature into the heating arrangement by means of a pump;
  melting the aluminium into liquid aluminium by heating the heating arrangement with the superheated steam having the heating arrangement temperature;
  atomizing the liquid aluminium with the superheated steam exiting the heating arrangement;
  reacting the liquid atomized aluminium with the superheated steam exiting the heating arrangement to produce at least aluminium oxide, hydrogen and heat, thereby increasing the temperature of the superheated steam in the reactor that is not consumed by the reaction with the liquid atomized aluminium and/or an inert gas to a reactor temperature;
  transporting the superheated steam and/or the inert gas having the reactor temperature and hydrogen to the combustion chamber which is in direct connection to the heat consumer;

providing oxygen or air to the combustion chamber from an external oxygen source, an external air supply or from the atmosphere spontaneously combusting hydrogen inside the combustion chamber to increase the temperature of the superheated steam to a heat consumer temperature;

transporting superheated steam having the heating arrangement temperature from the heat consumer to the heating arrangement, exchanging heat between the superheated steam and the heat consumer where the heat consumer has a heat exchange medium within lowering the temperature of the superheated steam leaving the combustion chamber, to the heating arrangement temperature, or transporting the hydrogen to a combustion chamber arranged in direct connection to the heat consumer, providing oxygen or air to the combustion chamber from an external oxygen source, an external air supply or from the atmosphere, spontaneously combusting the hydrogen inside the combustion chamber to provide high temperature exhausts to the heat consumer, adding superheated steam to the heat generating arrangement continuously.

The method may further comprise:

providing a first amount of superheated steam to the heat generating arrangement, exceeding what is required for the reaction with the liquid atomized aluminium.

The method may further comprise:

regulating the velocity and pressure of the superheated steam to control the reactor temperature by means of the pump.

The method may further comprise:

continually feeding the aluminium into the heating arrangement by a feeding mechanism, where the aluminium is a solid piece of aluminium.

The method may further comprise:

providing a bypass connection between the reactor and the heating arrangement, allowing superheated steam to bypass the combustion chamber.

The advantages with the method are the same as for the arrangement described above.

The invention also relates to a system comprising a heat generating arrangement, an aluminium source and a first amount of superheated steam, wherein the heat generating arrangement comprises:

a heating arrangement arranged to receive aluminium from the aluminium source and superheated steam, wherein the heating arrangement is arranged to be heated by superheated steam having a heating arrangement temperature and arranged to melt the aluminium inside the heating arrangement to form liquid aluminium, an atomizing arrangement arranged at an outer end of the heating arrangement arranged to atomize the liquid aluminium at the outer end of the heating arrangement by using superheated steam exiting the heating arrangement as atomizer;

a reactor connected to the outer end of the heating arrangement in which the liquid atomized aluminium is arranged to react with the superheated steam exiting the heating arrangement to produce aluminium oxide, hydrogen and heat, thereby increasing the temperature of superheated steam that is not consumed by the reaction with the liquid atomized aluminium in the reactor and/or an inert gas to a reactor temperature;

a combustion chamber connected to the reactor and to the heating arrangement arranged to receive superheated steam having the reactor temperature and hydrogen, wherein oxygen or air is provided to the combustion chamber from an external oxygen source, an external air supply or from the atmosphere, wherein a heat consumer is arranged in direction connection to the combustion chamber, where the hydrogen is spontaneously combusted inside the combustion chamber either to increase the temperature of the superheated steam to a heat consumer temperature, the superheated steam exchanging heat with a heat exchange medium within a heat consumer arranged in direct connection to the combustion, lowering the temperature of the superheated steam to the heating arrangement temperature, where superheated steam having the heating arrangement temperature leaving the combustion chamber is transported to the heating arrangement by means of a pump connected to the combustion chamber and the heating arrangement, or to provide high temperature, and if desired, high pressure exhausts to the heat consumer.

The reactor temperature may be in the range of approximately 660° C.-1100° C., the heating arrangement temperature is higher than the melting temperature of aluminium and the heat consumer temperature may be in the range of approximately 700° C.-1900° C.

The heat consumer may comprise a heat exchange medium, where the heat exchange medium is e.g. the working fluid of a Stirling engine or water.

The heat consumer extracts heat from the superheated steam generated by the reactions in the heat generating arrangement. The amount of heat extracted by the heat consumer is in balance with the heat produced by the reactions in the heat generating arrangement and the temperature of the heat exchange medium can be held constant at a desirable level. The temperature of the heat exchanger medium depends on the energy flow, mass flow and heat capacity. A typical temperature of the heat consumer fluid is in the range of approximately 400-900° C.

Using air as oxidiser, the combustion chamber may comprise a vertical column in which the heat consumer, a second heat exchanger and a third heat exchanger is arranged, where the second heat exchanger is arranged to produce superheated steam at a heating arrangement temperature needed to melt the aluminium for the first reaction between the aluminium and the superheated steam from the separated water being pumped from the separator, where the third heat exchanger is arranged to preheat air from air inlet. This allows for a better utilization of the heat created in the combustion chamber and a higher overall efficiency.

The invention also relates to a heating arrangement for melting of a metals and/or alloys, comprising at least one gas inlet, arranged to receive a superheated gas, a gas compartment connected to the at least one gas inlet, a melting chamber arranged to receive solid metal or alloy at one end of the melting chamber, the melting chamber being arranged in thermal connection with the gas compartment such that heat exchange between the superheated gas melts the metal or alloy, an atomizing arrangement connected to a second end of the melting section, arranged to atomize the melted metal or alloy using the superheated gas as atomizer.

A heating arrangement according to the disclosure allows for a controllable melting of a metal or alloy and controlled atomization of the melted metal or alloy.

The melting section is preferably made of titanium or ceramics, such as e.g. silicon nitride or aluminium titanate, in order to avoid diffusion and corrosion of molten aluminium.

The atomizing arrangement may comprise a number of pilot jets that are used to stabilize the flow, increase turbulence and improve atomization of the molten metal or alloy.

DETAILED DESCRIPTION

Figure 1:
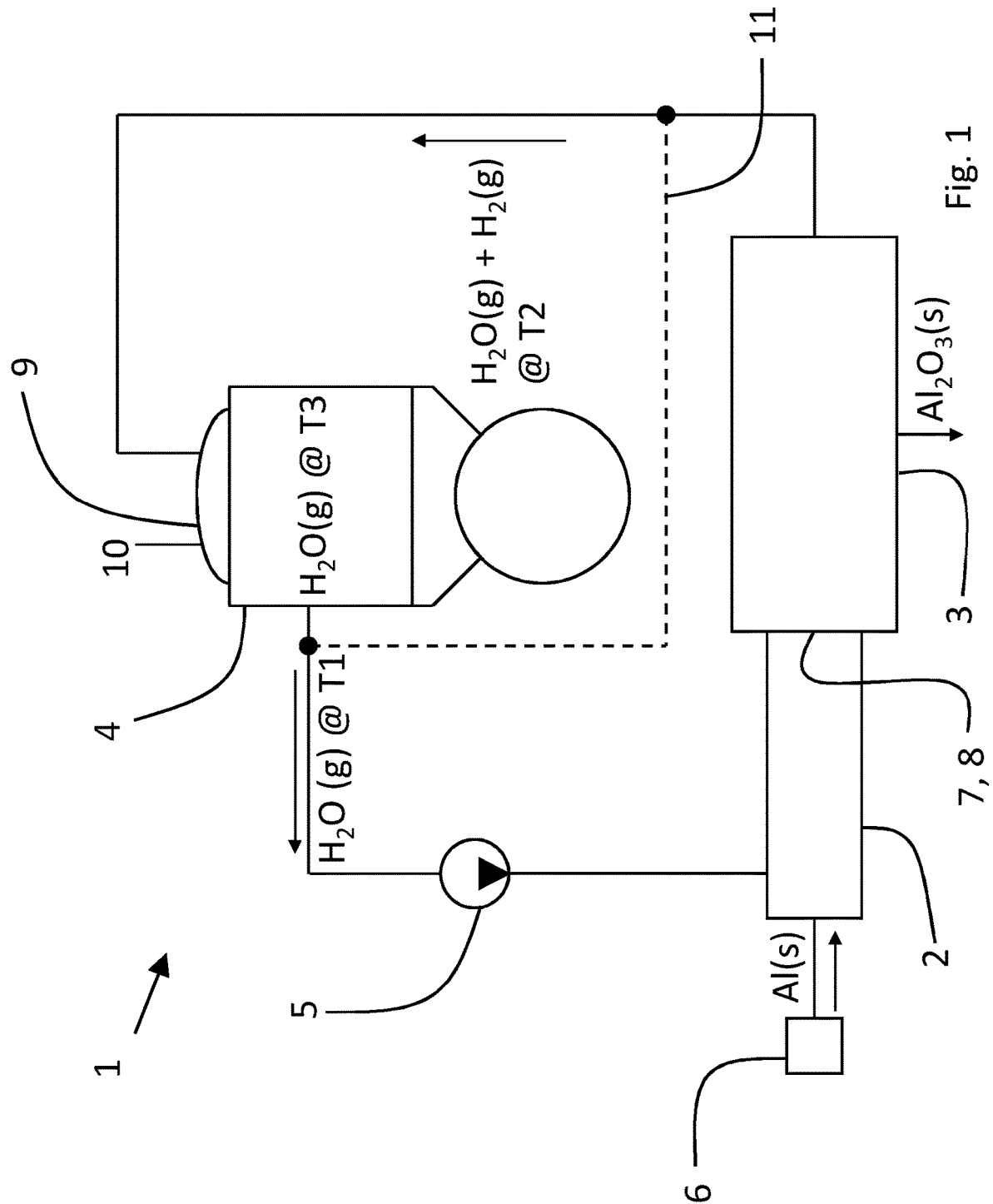
FIG. 1 schematically shows a heat generating arrangement according to the disclosure.

FIG. 1 schematically shows a heat generating arrangement 1 according to the disclosure. The heat generating arrangement 1 comprises a heating arrangement 2 connected to a reactor 3, including a separator for metal oxides. The reactor 3 is in turn connected to a combustion chamber 9. A heat consumer 4 is arranged in direct connection to the combustion inside the combustion chamber 9. The combustion chamber 9 is connected to a pump 5, which in turn is connected to the heating arrangement 2, completing the heat generating arrangement 1.

Inside the heat generating arrangement 1, superheated steam or, alternatively, a mixture of superheated steam and an inert gas, is circulated. In case only superheated steam is used inside the heat generating arrangement 1, a first amount, or volume, of superheated steam, exceeding the amount required to completely react with the amount of aluminium provided into the heating arrangement 2, is used. The amount, or volume, of superheated steam can be controlled to balance the reaction with the aluminium provided into the heating arrangement 2 or to have an amount exceeding the amount required to completely react with the aluminium provided into the heating arrangement 2. This can be made both for when only superheated steam is used or in case a mixture of superheated steam and an inert gas is used. Ideally, no losses of superheated steam, or superheated steam and the inert gas, occur during operation of the system. This leads to that the amount of superheated steam can be varied for various operational scenarios, e.g. for different desired temperatures of the superheated steam or steam mixture throughout the arrangement and/or to control the pressure inside the heat generating arrangement 1. Controlling the amount of superheated steam in the heat generating arrangement 1 can for instance be made by injecting superheated steam into the heat generating arrangement 1 from an external source or by venting superheated steam from the heat generating arrangement 1. Alternatively, an inert gas can be injected or vented from the heat generating arrangement.

An aluminium source 6 is connected to the heating arrangement 2 and is arranged to provide aluminium to the heating arrangement 2. In one example, the aluminium can be supplied as a wire rolled on spools. In another example, an integrated machine from which a wire can be drawn from an aluminium bar, or similar, provides a wire of aluminium to be fed into the heating arrangement 2. The speed of the feeding of the wire can be controlled in order to adjust the amount of aluminium provided into the heating arrangement 2 and thereby in turn, the amount of aluminium fed into the reactor 3 to control reaction conditions for the reaction between aluminium and the superheated steam.

The heating arrangement 2, being connected to the combustion chamber 9 via the pump 5, is arranged to receive superheated steam exiting from the combustion chamber 9. The heat stored in the superheated steam is exchanged with the aluminium inside the heating arrangement 2, raising the temperature of the aluminium past its melting temperature and thereby causing the aluminium to melt into liquid aluminium. The temperature of the superheated steam entering the heating arrangement 2, i.e. the heating arrangement temperature T1 is controlled to be higher than the melting point of aluminium, i.e. higher than approximately 660° C. The heating arrangement temperature T1 in one example is approximately 700° C. The aluminium enters the heating arrangement 2 such that the aluminium inside the heating arrangement 2 is guided through a melting section, which in turn is completely surrounded, by the superheated steam. The heating arrangement is described further in detail below.

If the temperature of the superheated steam entering the heating arrangement 2 is cooler than the heating arrangement temperature T1, additional heating may be required to melt the aluminium, which increases the complexity and cost of the heat generating arrangement 1.

The heating arrangement 2 is connected to the reactor 3 by an outer end 7 of the heating arrangement 2. The outer end 7 comprises an atomizing arrangement 8 in which the superheated steam, having exchanged heat with the aluminium, is used to atomize the now liquid aluminium. The atomization ensures that liquid aluminium droplets without a passivating layer of aluminium oxide can get in contact with the superheated steam. In the reactor 3, the following reaction takes place:

$$2\ Al(l) + 3H_2O(g) \rightarrow Al_2O_3(s) + 3H_2(g) + 817\ kJ \qquad (1)$$

The atomization of the liquid aluminium enables an efficient reaction between the liquid aluminium and the superheated steam. Suitable atomizing nozzles for the atomizing arrangement 8 can be based on techniques known in the art, such as nozzle for a paint sprayer, a nozzle for a pressure washer or an air atomizing spray nozzle with materials adapted to withstand the temperatures of the melted aluminium and the superheated steam.

The pump 5 provides the flow and pressure necessary for atomization to take place in the atomizing nozzle and for ensuring the first reaction (1) takes place at a distance from the atomizing nozzle. The aluminium oxide created by the reaction is a solid and is separated from the superheated steam or mixture of superheated steam/inert gas before exiting the reactor 3. Separation of the solid aluminium oxide dust from the superheated steam and hydrogen gas could be achieved with a centrifugal dust separator known in the art. The pump 5 can be used to provide a flow through the reactor for cyclonic separation of the aluminium oxide from the superheated steam/hydrogen gas mixture.

The aluminium oxide separated from the steam and hydrogen and is stored until it can be regenerated into pure aluminium, for instance high-temperature electrolysis with an inert anode. The aluminium oxide produced by the first reaction is thus a reusable resource that can be regenerated, i.e. recycled, to form a fresh supply of elemental aluminium to be used again in the heat generating arrangement 1.

The heat generated by the reaction between the liquid aluminium and the superheated steam raises the temperature of the superheated steam that is not consumed by the first reaction and/or an inert gas to a reactor temperature T2 of approximately 660° C. to 1100° C. This temperature ensures a droplet size that enables the exothermic reaction energy release sufficient to keep the first reaction self-sustained. Maintaining the reaction temperature T2 within this temperature interval, the material in the reactor 3 could be made of ordinary heat resistant metals and a desired heat consumer temperature T3 can be reached.

The superheated steam having the reactor temperature T2 together with the hydrogen created by reaction 1 is transported to a combustion chamber 9 of the heat consumer 4. The reactor may be insulated to reduce a loss in temperature of the superheated steam that is not consumed by the reaction with the liquid atomized aluminium in the reactor 3. Inside the combustion chamber 9, oxygen is supplied from an external oxygen source by means of an oxygen tank connection 10 and the hydrogen is combusted in the following reaction:

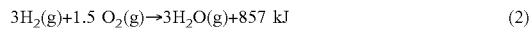

$$3H_2(g)+1.5\ O_2(g) \rightarrow 3H_2O(g)+857\ kJ \tag{2}$$

Due to that the reactor temperature T2 (approximately 660° C. to 1100° C.) is significantly higher than the autoignition temperature of hydrogen (approximately 500° C.), the hydrogen will spontaneously ignite when entering the combustion chamber 9, triggering the second reaction (2). This removes the need for an external source of ignition.

Comparing reaction 1 and 2, it can be seen that the same amount of water, in the form of superheated steam, consumed in reaction 1 is created in reaction 2. In this way, it is possible to maintain the amount of water in the reactions in a closed system, not supplying any additional water for the reactions. Water may be added or removed to control the flow of superheated steam inside the heat generating arrangement 1. The balance of water content in the heat generating arrangement is especially important during start up or at other transients. Water is preferably added as externally produced superheated steam. The ratio of aluminium flow and excess of superheated steam in the heating arrangement 2 is governed by the pump 5.

The heat generated in the second reaction (2) is used to further increase the temperature of the superheated steam to a heat consumer temperature T3 in the range of approximately 700° C. to 1900° C., preferably approximately 1200° C. The second reaction increases the heat quality of the superheated steam in the combustion chamber 9, improving the heat transfer to the heat consumer 4. The superheated steam having the heat consumer temperature T3 now exchanges heat with a heat exchange medium within the heat consumer 4, where the heat consumer 4 in FIG. 1 is a part of a heat exchanger or part of a working fluid circuit of a Stirling engine. The heat exchange between the superheated steam in the combustion chamber and the heat exchange medium in the heat exchanger lowers the temperature of the superheated steam leaving the combustion chamber 9, to the heating arrangement temperature T1, e.g. to approximately 700° C. The superheated steam leaving the combustion chamber 4 having the heating arrangement temperature T1, is pumped by the pump 5 to the heating arrangement 2, completing the cycle inside the heat generating arrangement 1.

During combustion of the hydrogen in the combustion chamber 9, the heat consumer is designed not to come in direct contact with the reaction zone, having a local temperature superseding the material capacity of the heat exchanger. Temperatures too high, i.e. above 1200° C., could damage the material of the heat consumer 4 and would lead to material degradation and increase the need to replace the parts of the heat consumer 4 present in the combustion chamber 9. The heat exchange medium in the heat consumer 4 before heat exchange has a temperature that ensures that the material of the heat consumer 4 will not rise to a temperature that is damaging to the material. Temperatures of a Stirling engine working fluid is typically approximately 500-700° C. in the hot heat exchanger. The steam in steam turbines ranges from approximately 200-620° C. The heat exchanged to the heat consumer must be in balance with the flow of aluminium in order keep a constant temperature of the heat exchanger. If the temperature drops too low, (too much heat used) the efficiency of the Stirling engine or steam turbine will drop. If the temperature gets too high, (insufficient amount of heat is used) materials of the combustion chamber and heat exchanger can degrade.

In FIG. 1, the heat consumer 4 is in one example a Stirling engine and the medium of the heat consumer 4 is the working fluid of the Stirling engine. In another example, the heat consumer 4 is a heat exchanger, for instance providing heat for district heating. In this case, the medium of the heat consumer 4 is water. Other examples of heat consumers 4 are of course conceivable.

In operation, the heating arrangement temperature T1, the reactor temperature T2 and the heat consumer temperature T3 are affected by the amount of aluminium entered into the heating arrangement 2, the speed with which the pump 5 pumps the superheated steam, the amount of superheated steam (with or without inert gas) in the system and the heat withdrawal of the heat consumer 4. To ensure system stability, these temperatures need to be controlled. Thus, temperature-affecting parameters needs to be measured and/or controlled. This can be done with techniques known in the art.

When starting the arrangement, superheated steam is provided from an external source (not shown) and is used to purge the heat generating arrangement 1 and supply the heat generating arrangement 1 with steam until an amount of superheated steam that suits the pump performance is reached. This amount of steam is then circulated inside the heat generating arrangement 1 with heat supplied from an external source in order to heat the respective parts of the heat generating arrangement 1 to their operational temperatures. A by-pass conduit 11, marked by a dashed line, is arranged between the reactor 3 and the pump 5 in order to bypass the combustion chamber 9 and heat consumer 4. As the temperature of the superheated steam reaches a temperature above the melting temperature of aluminium, reaction 1 can start, further increasing the temperature in the arrangement. In the start procedure, the temperature at the entry of the pump 5, i.e., the heating arrangement temperature T1 is controlled by a shunt valve at the entry of the bypass. When it is possible to start supplying aluminium into the heating arrangement 2, a part of the superheated steam is sent into the combustion chamber 9 in order to raise the temperature of the heat consumer 4 in a controlled manner. As the temperature of the superheated steam reaches the reactor temperature T2, the by-pass conduit 11 is closed and the hydrogen can be combusted in the combustion chamber 9 in order for the temperature in the heat consumer 4 to reach the heat consumer temperature T3.

During start-up of the arrangement, the pressure in the system is closely monitored and steam can be added or removed in order to obtain desired pressure and temperature inside the arrangement during every step of the start-up. Normal operating sensors are also installed in order to monitor temperatures, pressures, mass flows etc. as well as safety measures such as check valves, relief valves and emergency shutdown systems. These will not be described in detail.

In FIG. 1, flows of aluminium, aluminium oxide, superheated steam and hydrogen together with the temperatures of the superheated steam are shown during normal operation to illustrate the process. The arrows indicate the flow direction.

Figure 2:
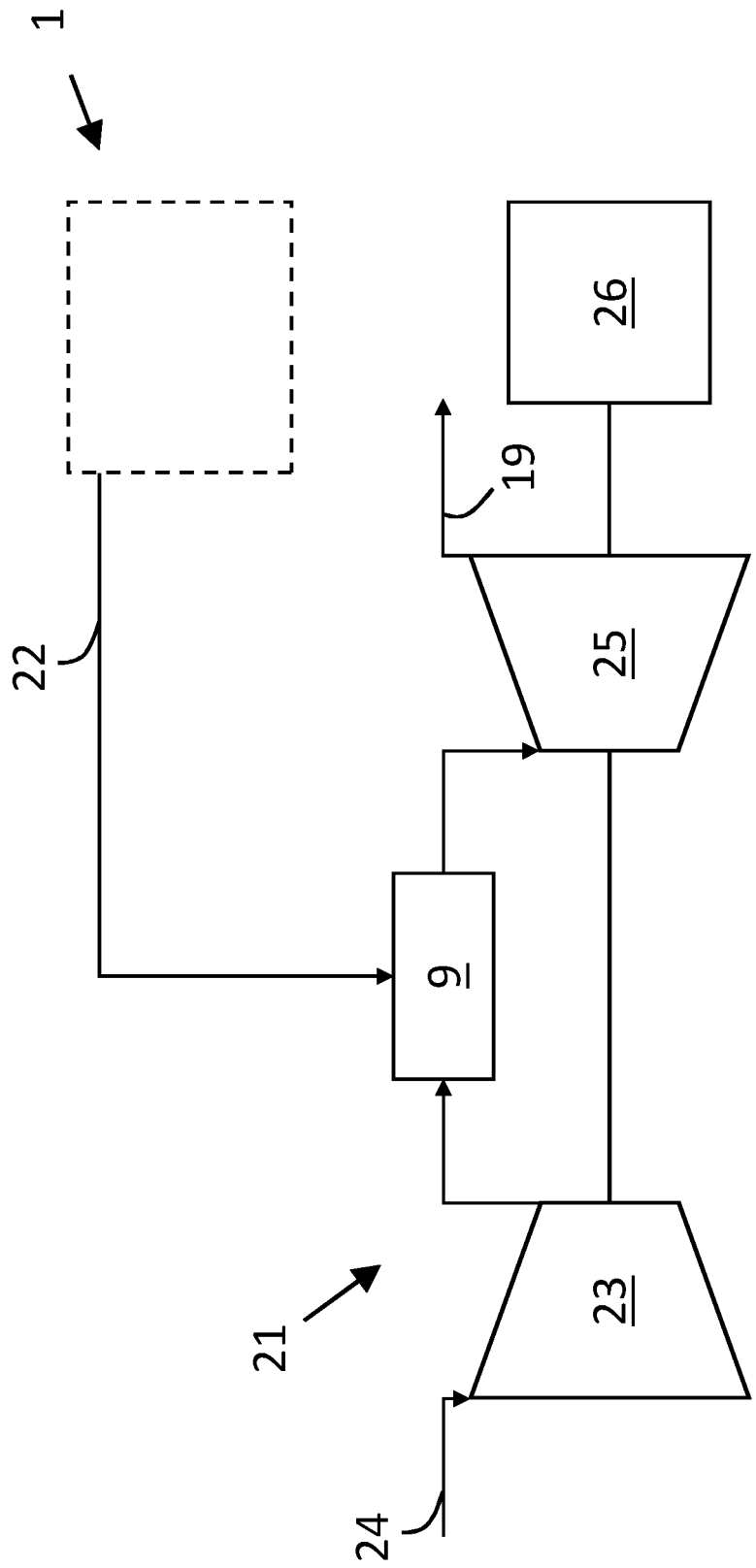
FIG. 2 schematically shows an electric power-generating unit using a heat generating arrangement 1 according to FIG. 1.

FIG. 2 schematically shows an electric power-generating unit, i.e. a power plant, using a heat generating arrangement 1 according to FIG. 1. As an alternative to powering a vehicle, the heat generating arrangement 1 can be used to provide hydrogen to a gas turbine 21, where the superheated steam and hydrogen is fed to a combustion chamber 9 of the gas turbine 21 via a turbine conduit 22. Instead of pure oxygen as is used in the heat generating arrangement of FIG. 1, air enters a compressor 23 of the gas turbine through an inlet 24 and is compressed before entering the combustion chamber 9. The high temperature, and if required, high pressure exhausts from the combustion chamber 9 enters the turbine 25, maintaining the pressure in the expansion, causing the turbine 25 to rotate. The turbine 25 is in turn connected to a generator 26, where the rotation of the generator 26 generates electrical power. Finally, low temperature and low-pressure exhausts leave the turbine through exhaust conduit 19.

In this example embodiment, the exhaust conduit 19 is not connected to the heat generating arrangement 1. In this case, water in the shape of superheated steam has to be added to the heat generating arrangement 1 in order to maintain the reaction with the aluminium as the superheated steam would be consumed as hydrogen is removed. As an alternative, the exhaust from the gas turbine 21 could heat water to superheated steam that can be used in the heat generating arrangement 1. Alternatively, the energy from the first reaction can be used for district heating, by condensing the steam into water with a temperature suitable for district heating and pure hydrogen is provided to the combustion chamber (9).

As an alternative to the gas turbine 21 of FIG. 2, the heat generating arrangement 1 can be used to produce superheated steam required to drive a steam turbine. In this case, the boiler of the Rankine cycle will be the heat consumer of the heating arrangement. Typical steam turbine power plants use the remaining heat in the condenser to produce district heating to nearby houses or industries that require warm water.

Figure 3:
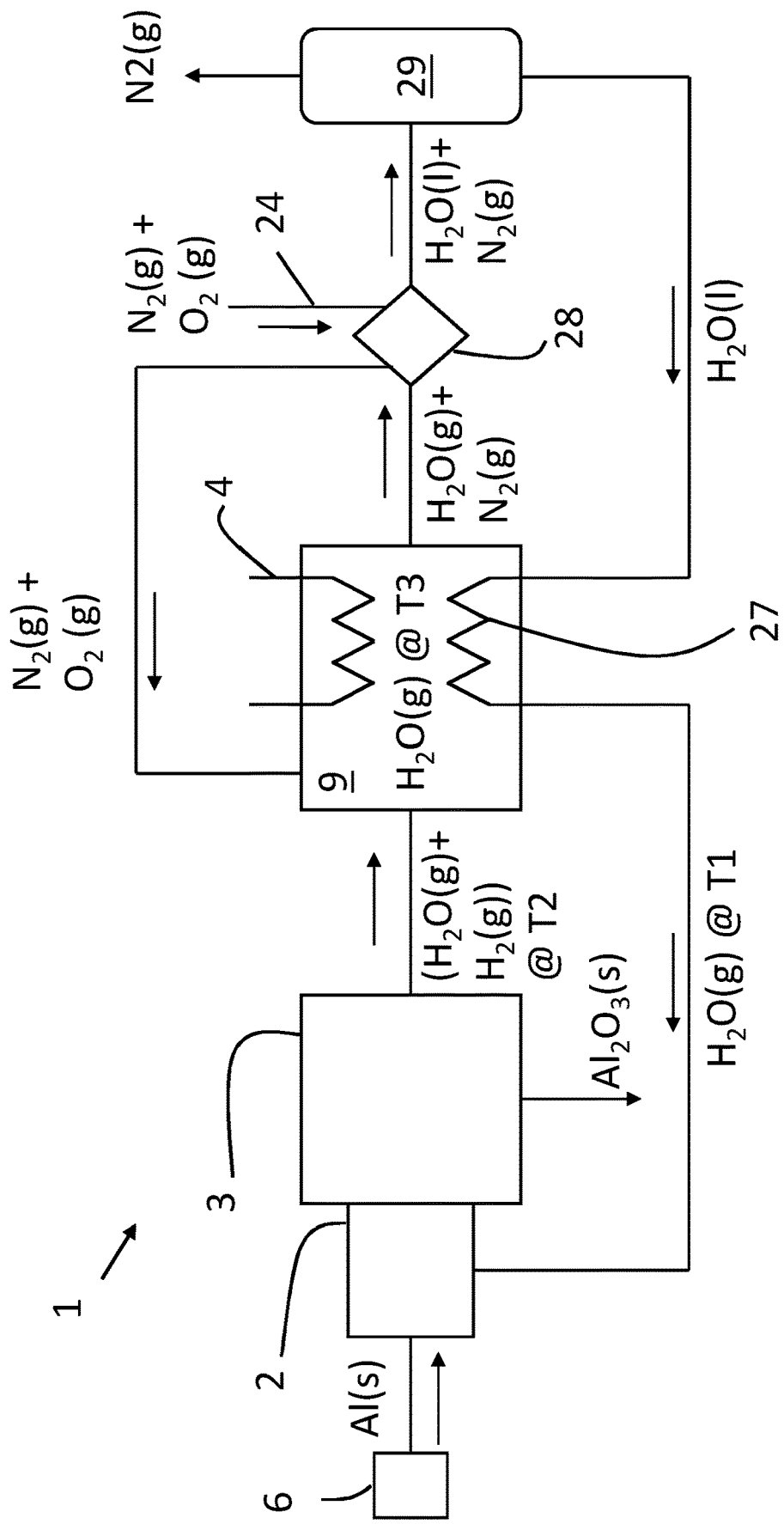
FIG. 3 discloses in more detail an open loop system using air as the supply of oxygen to combust the hydrogen according to a first embodiment of the disclosure, FIG. 4 discloses an open loop system using air as the supply of oxygen to combust the hydrogen according to a second embodiment of the disclosure, FIG. 5 schematically shows an example of a heating arrangement according to the disclosure.

FIG. 3 discloses in more detail a system using air as the supply of oxygen to combust the hydrogen according to a first embodiment of the disclosure. The heat consumer 4 in this example is a heat exchanger and the system further comprises a steam heat exchanger 27 located inside the combustion chamber 9. In FIG. 3, the nitrogen in the air serves as an inert gas together with the steam. A condenser 28 that takes in air from the outside by an inlet 24 allows the steam from the combustion chamber 9 to condense to water and the remaining nitrogen can be separated from the water and released from the system, using a suitable separator 29. If needed, separator 29 can be supplied with a cooler in order to complete the condensation of water. The heated air from the condenser 28 is fed to the combustion chamber 9 where the oxygen is used to combust the hydrogen. The condensed water is returned to the steam heat exchanger 27 inside the combustion chamber 9 and exchanges heat with the superheated steam in the combustion chamber 9 having the heat consumer temperature T3 whereby it is converted into superheated steam having the heating arrangement temperature T1. From the steam heat exchanger 27, superheated steam having the heating arrangement temperature T1 is transported to the heating arrangement 2 to melt and react with the aluminium.

Figure 4:
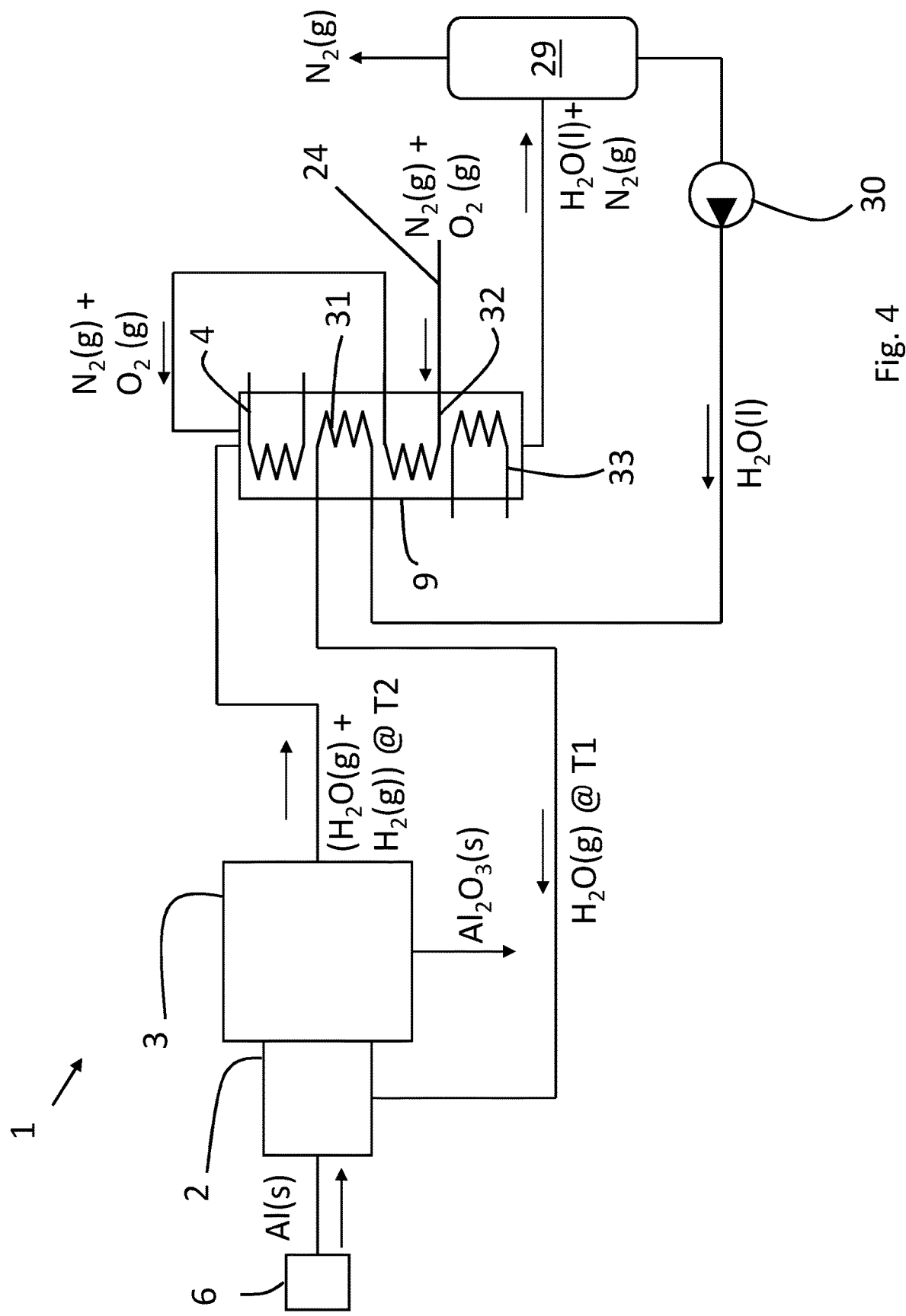

FIG. 4 discloses an open loop system using air as the supply of oxygen to combust the hydrogen according to a second embodiment of the disclosure.

In FIG. 4, the combustion chamber 9 is a vertical column where the superheated steam and hydrogen enters in a top part. Also in the top part of the combustion chamber 9, air is supplied to the combustion chamber 9. Since the temperature of the hydrogen is above its autoignition temperature, combustion will occur spontaneously when oxygen from the air is mixed in with the hydrogen and superheated steam. If a stoichiometric ratio between oxygen and hydrogen is used, the gas mixture after combustion will be essentially only steam and nitrogen.

The combustion chamber 9 in the second embodiment contains four steps of heat exchangers arranged in a column underneath each other. The superheated steam and nitrogen temperature drops every time the gas flow passes a heat exchanger.

Since the combustion chamber 9 is arranged vertically, condensed water can exit in a bottom part of the combustion chamber 9 without any need for a pump. At the bottom of the combustion chamber 9, the water has completely condensed to liquid form and the nitrogen can be separated from the water in separator 29 as described in conjunction with the first embodiment of FIG. 3. The separated water can now be circulated back into the system by means of pump 30.

The principle of the combustion chamber 9 according to the second embodiment is to preserve the energy within the arrangement after heat exchange has taken place between the superheated steam with the heat consumer temperature T3 and the heat exchange medium of the heat consumer 4.

The heat exchanger order in the combustion chamber is based on the temperature need for the medium in each heat exchanger. The combustion chamber 9 is to arranged to have a combustion zone and thereby a hottest section in the top part. In this top part, the temperature of the superheated steam is at or close to the heat consumer temperature T3 for heat exchange with the first heat exchanger or heat consumer 4 as it serves as a power output from the arrangement. Below the heat consumer 4A, second heat exchanger 31 is arranged to produce superheated steam at a heating arrangement temperature T1 needed to melt the aluminium for the first reaction between the aluminium and the superheated steam from the separated water being pumped from the separator 29. As described above, it is important that the temperature of the superheated steam entering the heating arrangement is high enough to ensure melting of the aluminium and thereby ensure that reaction between the aluminium and the superheated steam can take place.

A third heat exchanger 32 works as a preheater of the air from air inlet 24 before combustion by exchanging heat with the superheated steam and thereby transferring heat back to the system instead of it being wasted.

A fourth heat exchanger 33 is an externally connected cooler that can be used to ensure that the water is fully condensed before exiting the combustion chamber 9. The fourth heat exchanger is optional. This can be required if there is insufficient heat transfer between the superheated steam in the first three heat exchangers 4, 31, 32 such that the water has not condensed completely when reaching the bottom of the combustion chamber 9. The combustion chamber can also be oriented differently, e.g. horizontally as long as the steam can be arranged to pass the heat exchangers 4, 31, 32 and possibly 33 in the desired order.

Figure 5:
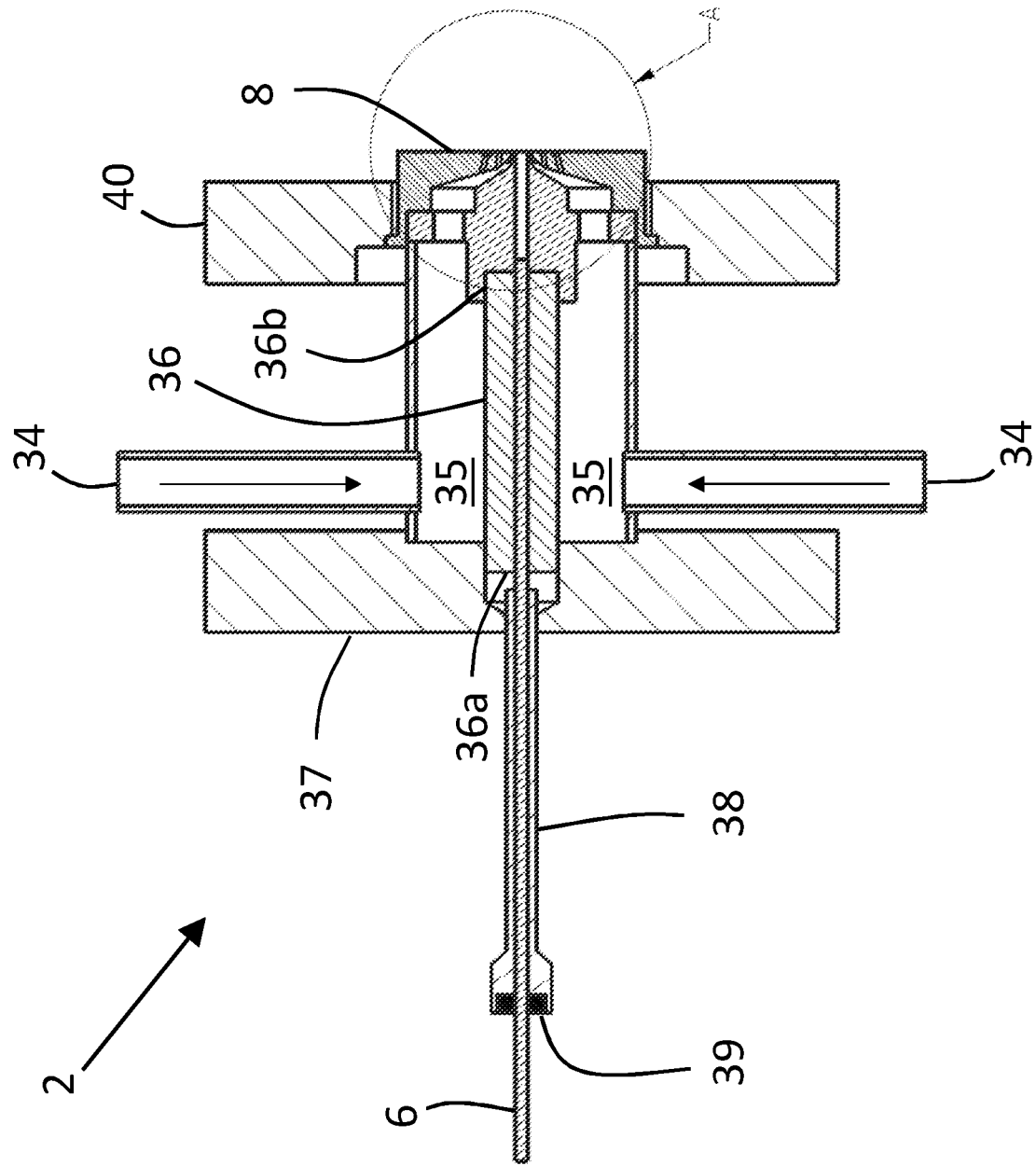

FIG. 5 schematically shows an example of a heating arrangement according to an example embodiment the disclosure.

The heating arrangement 2 comprises multiple inlets 34 for injection of superheated steam with the heating arrangement temperature T1. In this way, the superheated steam can create counter flows inside a steam compartment 35 of the heating arrangement 2 for uniform heat distribution of a melting section 36. One inlet 34 is also possible, as well as more than two inlets 34. The melting section 36 is arranged to transfer the heat from the steam to the aluminium source 6, in this example embodiment an aluminium wire. The melting section 36 ensures that the aluminium wire melts without any contact with the steam inside the steam compartment 35 causing a premature first reaction. To reduce the diffusion of the molten aluminium into the wall of the melting section 36, the melting section 36 is preferably made of titanium or ceramics such as silicon nitride.

The heating arrangement further comprises a first flange 37 through which the aluminium source 6 is fed via an inlet extension 38 to a first end 36a of the melting section 36. Together with a seal 39 installed in a rear part of the inlet extension 38 that prevents air intrusion into the heating arrangement avoiding unwanted oxidation of the aluminium, the inlet extension 38 reduces the temperature of the aluminium wire before entering the melting section 36.

A second flange 40 makes up part of the outer end 7 connecting the heating arrangement 2 to the reactor 3.

Figure 6:
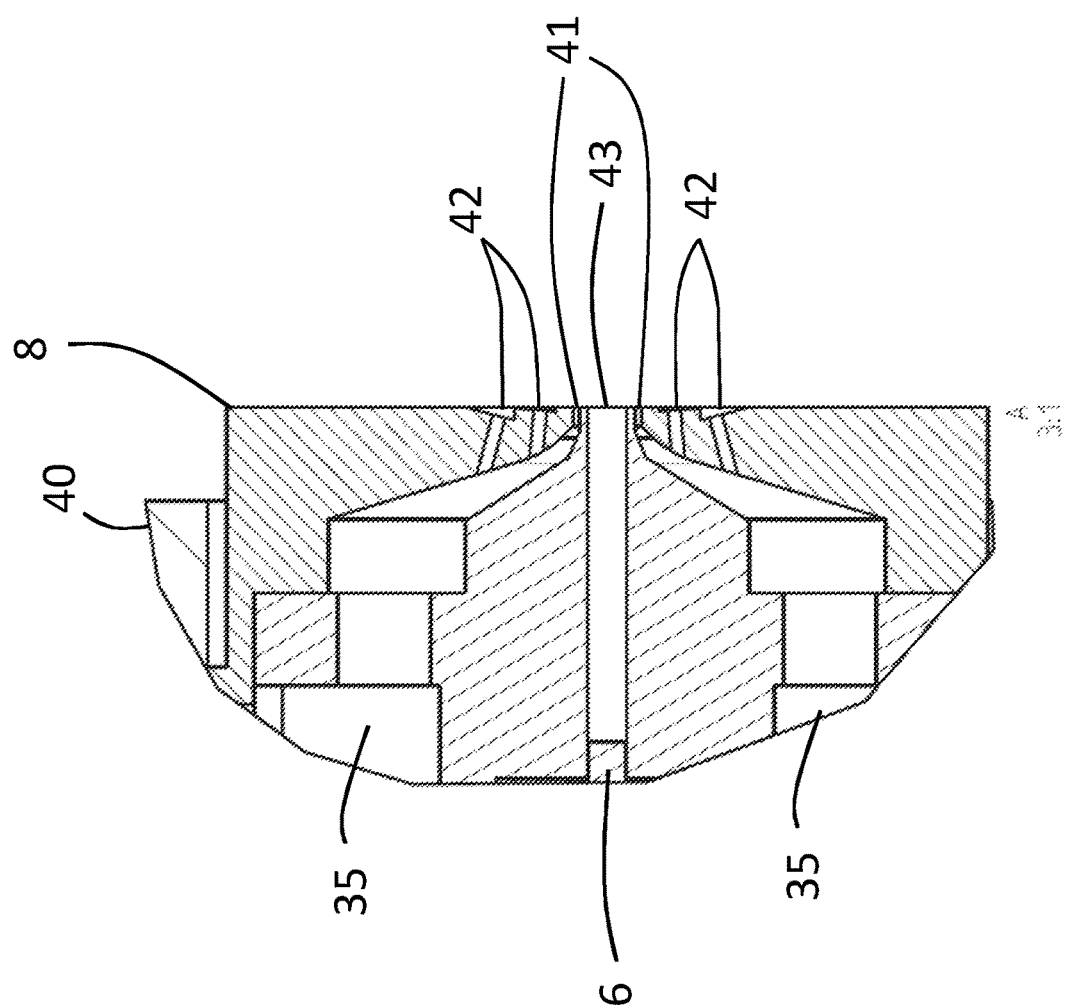
FIG. 6 schematically shows a close up of an atomizing arrangement of the heating arrangement of FIG. 5.

The atomizing arrangement 8 is connected to a second end 36b of the melting section 36 and extends through the front flange 40 as can be seen in the enlargement of FIG. 6. The atomizing arrangement 8 comprises an annular main jet 41 and a number of pilot jets 42 that are used to stabilize the flow, increase turbulence and improve atomization of the molten aluminium. The molten aluminium exits through feed mouth 43 arranged in the centre of the jets 41, 42. The main jet 41 creates a high-speed steam exit surrounding the feed mouth 43 in an annular shape. The high-speed steam exit creates a zone with low static pressure. When slow flowing liquid aluminium meets the high-speed flow of superheated steam, the impulse will violently shear the liquid aluminium into small droplets.

The atomizing arrangement 8 utilizes atomizing nozzles known in the art to ensure that the superheated steam, driven by the pump 5, exiting at high speed, will atomize the liquid aluminium and create a sudden surface area increase of the liquid aluminium through the atomization. The increased surface area in a fraction of a second of the aluminium will ensure that initial reactions between aluminium and steam will generate sufficient local heat to complete the reaction of all aluminium with the superheated steam. The atomizing arrangement ensures a droplet size that enables the exothermic reaction energy release is sufficient to be keep the reaction self-sustained.

The impulse created by the high speed of the superheated steam will push the reaction zone of the aluminium and superheated steam away from the atomizing arrangement exits, i.e. away from the jets 41, 42 and feed mouth 43, thereby preventing overheating of the atomizing arrangement. Thus, the reaction between the aluminium and the steam takes place at a distance from the nozzle and no contact between the aluminium and the steam takes place inside the nozzle.

The heating arrangement with its atomizing arrangement can also be used in other applications and with other metals or alloys where suitable. Instead of superheated steam, other superheated gases can be used to melt the metal or alloy and to atomize the melted metal or alloy and react with the atomized metal or alloy. In such case, the more general term gas compartment can be used instead of steam compartment.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description are to be regarded as illustrative in nature, and not restrictive. For example, in the cases where only superheated steam is mentioned, a combination of superheated steam and an inert gas can be used.

The invention claimed is:

1. A heat generating arrangement for generating heat for use in a heat consumer, wherein the heat generating arrangement comprises:
 a heating apparatus arranged to receive aluminium and superheated steam, wherein the heating apparatus is arranged to be heated by superheated steam having a heating arrangement temperature and arranged to melt the aluminium inside the heating apparatus to form liquid aluminium,
 an atomizer arranged at an outer end of the heating apparatus arranged to atomize the liquid aluminium at the outer end of the apparatus by using superheated steam exiting the heating apparatus as the atomizer;
 a reactor connected to the outer end of the heating apparatus in which the liquid atomized aluminium is arranged to react with the superheated steam exiting the heating apparatus to produce aluminium oxide, hydrogen and heat, thereby increasing the temperature of the superheated steam that is not consumed by the reaction with the liquid atomized aluminium in the reactor to a reactor temperature;
 a combustion chamber connected to the reactor and to the heating apparatus arranged to receive superheated steam having the reactor temperature and hydrogen, wherein oxygen or air is provided to the combustion chamber from an external oxygen source, an external air supply or from the atmosphere, wherein the heat consumer is arranged in direct connection to the combustion chamber, where:
 either the hydrogen is spontaneously combusted inside the combustion chamber to increase the temperature of the superheated steam to a heat consumer temperature, where the superheated steam having the heat consumer temperature exchanges heat with a heat exchange medium within the heat consumer, lowering the temperature of the superheated steam to the heating arrangement temperature,
 or the hydrogen is spontaneously combusted inside the combustion chamber to provide high temperature exhausts to the heat consumer and where superheated steam is continuously added to the heat generating arrangement, wherein a bypass connection is arranged between the reactor and the heating apparatus, allowing superheated steam to bypass the combustion chamber.

2. The heat generating arrangement according to claim 1, wherein a pump connected to the combustion chamber and the heating apparatus is arranged to transport the superheated steam having the heating arrangement temperature from the combustion chamber to the heating apparatus.

3. The heat generating arrangement according to claim 2, wherein the pump is arranged to regulate pressure and velocity of the superheated steam in the heat generating arrangement to control the reactor temperature.

4. The heat generating arrangement according to claim 1, wherein the heat generating arrangement is arranged to comprise a first amount of superheated steam, exceeding what is required to completely react with the liquid atomized aluminium.

5. The heat generating arrangement according to claim 1, wherein air is provided to the combustion chamber, the heat generating arrangement comprises or is arranged to be connected to a separator for separation of nitrogen.

6. The heat generating arrangement according to claim 1, wherein the heating apparatus is arranged to be fed aluminium as a solid piece of aluminium, wherein the heating apparatus comprises a feeding mechanism to continually feed the aluminium into the heating apparatus.

7. The heat generating arrangement according to claim 6, wherein the aluminium is in the form of an aluminium wire.

8. The heat generating arrangement according to claim 1, where the heat consumer is a heat exchanger or a heat engine.

9. The heat generating arrangement according to claim 8, where the heat engine is a Stirling engine.

10. The heat generating arrangement according to claim 1, wherein the reactor is insulated to reduce a temperature loss of the superheated steam that is not consumed by the reaction with the liquid atomized aluminium in the reactor.

11. A vehicle comprising one or more heat generating arrangements according to claim 1.

12. A power plant comprising one or more heat generating arrangements according to claim 1.

13. A heat generating arrangement according to claim 1, further comprising an aluminium source and a first amount of superheated steam; and
wherein the hydrogen is spontaneously combusted inside the combustion chamber to increase the temperature of the superheated steam to the heat consumer temperature, the superheated steam exchanging heat with the heat exchange medium within the heat consumer arranged in direct connection to the combustion, lowering the temperature of the superheated steam to the heating arrangement temperature, where superheated steam having the heating arrangement temperature leaving the combustion chamber is transported to the heating apparatus by means of a pump connected to the combustion chamber and the heating apparatus.

14. The heating arrangement according to claim 1, wherein the reactor temperature is in the range of approximately 6600° C.-1100° C., the heating arrangement temperature is higher than the melting temperature of aluminium and the heat consumer temperature is in the range of approximately 7000° C.-1900° C.

15. The heating arrangement according to claim 13, where the heat exchange medium is a working fluid of a Stirling engine or water.

16. The heating arrangement according to claim 13, wherein the combustion chamber comprises a vertical column in which the heat consumer, a second heat exchanger and a third heat exchanger is arranged, where the second heat exchanger is arranged to produce superheated steam at a heating arrangement temperature needed to melt the aluminium for the first reaction between the aluminium and the superheated steam from the separated water being pumped from the separator, where the third heat exchanger is arranged to preheat air from air inlet.

17. A heat generating arrangement according to claim 1, wherein the heating apparatus for melting of a metals and/or alloys comprises:
at least one gas inlet, arranged to receive a superheated gas,
a gas compartment connected to the at least one gas inlet,
a melting chamber arranged to receive solid metal or alloy at one end of the melting chamber, the melting chamber being arranged in thermal connection with the gas compartment such that heat exchange between the superheated gas melts the metal or alloy,
an atomizer connected to a second end of the melting section, arranged to atomize the melted metal or alloy using the superheated gas as the atomizer.

18. The heat generating arrangement according to claim 17, wherein the melting section is made of titanium or ceramics, such as silicon nitride.

19. The heat generating arrangement according to claim 17, wherein the atomizer comprises a main jet and a number of pilot jets that are used to stabilize the flow, increase turbulence and improve atomization of the molten metal or alloy.

20. A method for generation of heat for use in a heat consumer in a heat generating arrangement comprising a heating apparatus, a reactor and a combustion chamber, the method comprises:
providing aluminium to the heating apparatus;
providing superheated steam having a heating arrangement temperature into the heating apparatus by means of a pump;
melting the aluminium into liquid aluminium by heating the heating apparatus with the superheated steam having the heating arrangement temperature;
atomizing the liquid aluminium with the superheated steam exiting the heating apparatus in an atomizer on the heating apparatus;
reacting the liquid atomized aluminium with the superheated steam exiting the heating apparatus to produce aluminium oxide, hydrogen and heat, thereby increasing the temperature of the superheated steam in the reactor that is not consumed by the reaction with the liquid atomized aluminium and/or an inert gas to a reactor temperature;
separating the aluminium oxide from the superheated steam and hydrogen and either;
transporting the superheated steam and/or the inert gas having the reactor temperature and hydrogen to the combustion chamber which is in direct connection to the heat consumer;
providing oxygen or air to the combustion chamber from an external oxygen source, an external air supply or from the atmosphere,
spontaneously combusting hydrogen inside the combustion chamber to increase the temperature of the superheated steam to a heat consumer temperature;
exchanging heat between the superheated steam having the heat consumer temperature with a heat exchange medium within the heat consumer lowering the temperature of the superheated steam leaving the combustion chamber, to the heating arrangement temperature, transporting superheated steam having the heating arrangement temperature from the combustion chamber to the heating apparatus, or transporting the hydrogen to the combustion chamber arranged in direct connection to the heat consumer, providing oxygen or air to the combustion chamber from an external oxygen source, an external air supply or from the atmosphere, combusting the hydrogen inside the combustion chamber to provide high temperature exhausts to the heat consumer, and adding superheated steam to the heat generating arrangement continuously, wherein the method further comprises:

providing a bypass connection between the reactor and the heating apparatus allowing superheated steam to bypass the combustion chamber.

21. The method according to claim 20, wherein the method further comprises:

providing a first amount of superheated steam to the heat generating arrangement, exceeding what is required to completely react with the liquid atomized aluminium.

22. The method according to claim 20, wherein the method further comprises:

regulating the velocity and pressure of the superheated steam to control the reactor temperature by means of the pump.

23. The method according to claim 20, wherein the method further comprises:

continually feeding the aluminium into the heating apparatus by a feeding mechanism, where the aluminium is a solid piece of aluminium.

* * * * *